United States Patent
Wang et al.

(10) Patent No.: US 10,263,748 B2
(45) Date of Patent: Apr. 16, 2019

(54) METHOD AND APPARATUS FOR TRANSMITTING UPLINK DATA AND USER EQUIPMENT

(71) Applicant: SPREADTRUM COMMUNICATIONS (SHANGHAI) CO., LTD., Zhangjiang Shanghai (CN)

(72) Inventors: Shaofei Wang, Zhangjiang Shanghai (CN); Su Huang, Zhangjiang Shanghai (CN); Hualei Wang, Zhangjiang Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/924,870

(22) Filed: Mar. 19, 2018

(65) Prior Publication Data

US 2018/0278394 A1  Sep. 27, 2018

(30) Foreign Application Priority Data

Mar. 22, 2017  (CN) .......................... 2017 1 0174963

(51) Int. Cl.
*H04K 1/10* (2006.01)
*H04L 5/00* (2006.01)
*H04B 7/0413* (2017.01)
*H04L 27/26* (2006.01)

(52) U.S. Cl.
CPC ......... *H04L 5/0048* (2013.01); *H04B 7/0413* (2013.01); *H04L 5/0051* (2013.01); *H04L 27/26* (2013.01); *H04L 27/2613* (2013.01); *H04L 27/2628* (2013.01); *H04L 27/2636* (2013.01); *H04L 5/0007* (2013.01)

(58) Field of Classification Search
CPC ... H04L 27/26; H04L 27/2636; H04L 5/0007; H04L 27/2628; H04L 5/0048; G01S 13/346; H04B 7/0413
USPC .......................... 375/260, 259, 316, 295, 219
See application file for complete search history.

(56) References Cited

U.S. PATENT DOCUMENTS

| 2018/0091350 A1* | 3/2018 | Akkarakaran | ........ G01S 13/346 |
| 2018/0145854 A1* | 5/2018 | Akkarakaran | ........ H04L 27/261 |

* cited by examiner

*Primary Examiner* — Zewdu A Kassa
(74) *Attorney, Agent, or Firm* — Cantor Colburn LLP

(57) ABSTRACT

A method and an apparatus for transmitting an uplink data and a user equipment is provided, the method includes: inserting multiple phase noise tracking reference signal (PT-RS) groups into a user data to be sent in time domain, according to a predefined interval; wherein each group of the phase noise tracking reference signal includes one or multiple PT-RS(s) of adjacent sampling points in the time domain; transforming the inserted multiple phase noise tracking reference signal groups together with the user data to be sent into frequency domain through a discrete Fourier transform (DFT) followed with a subcarrier mapping, and then with a transformation through an inverse fast Fourier transform (IFFT), to obtain an uplink DFT-S-OFDM waveform; and transmitting the uplink DFT-S-OFDM waveform. Embodiments of this disclosure may increase the accuracy of tracking the uplink phase noise and the possible system residual frequency shift and Doppler frequency shift, and may improve the system performance.

9 Claims, 4 Drawing Sheets

METHOD AND APPARATUS FOR TRANSMITTING UPLINK DATA AND USER EQUIPMENT

CROSS-REFERENCE TO RELATED APPLICATIONS

The present invention claims priority under 35 U.S.C. § 119 to Chinese Patent Application No.201710174963.7, filed on Mar. 22, 2017, the entire disclosure of which are incorporated herein by reference.

TECHNICAL FIELD

This application generally relates to wireless communication technology field, and more particularly, to a method and an apparatus for transmitting an uplink data and a user equipment.

BACKGROUND

In a future 5G high-frequency communication, phase noise caused by a system crystal oscillation may not be ignored. Influences of the phase noise on an orthogonal frequency division multiplexing (OFDM) system mainly include two parts: common phase error (CPE) and inter-channel interference (ICI). In theory, influence of the CPE on every subcarrier of one OFDM symbol is same, which causes a common phase rotation that affects a performance of a receiver. While the influence of the ICI on each subcarrier is different, therefore, a phase tracking reference signal is mainly used for tracking and compensating for the CPE. Since a coherent time of the phase noise is very short and it varies within each OFDM symbol, therefore, a phase noise tracking reference signal (PT-RS) resource pattern is required to be designed densely in time domain, while sparsely in frequency domain. In addition, the PT-RS may further track and compensate for system residual frequency shift and Doppler frequency shift.

Since the user equipment (UE) side has a high demand for a peak-to-average power ratio (PAPR) of a transmitted signal, an additional discrete Fourier transform (DFT) operation is conducted for an uplink DFT-Spread OFDM (DFT-S-OFDM) at a transmitting terminal side compared to conventional OFDM waveform. Referring to FIG. 1, the data in the time-domain from the UE is transformed into the frequency domain by an M-point DFT firstly, and then goes through an N-point inverse fast Fourier transform (IFFT) following a subcarrier mapping, so that the uplink transmitted signal has a single carrier characteristic and the peak-to-average power ratio is decreased. While for the traditional OFDM waveform, the data in the frequency domain is mapped directly to a subcarrier at the transmitting terminal, and then goes through an N-point IFFT once to be transformed into the time domain.

For the PT-RS design of the DFT-S-OFDM, current 3GPP proposals mainly focus on two PT-RS insertion modes: pre-DFT and post-DFT. For the post-DFT mode, there are mainly includes ways: rate matching and puncturing, which both increase the peak-to-average power ratio of the transmitted signal and may increase complexity of computing the DFT and deteriorate performance of the system. In contrast, for the pre-DFT mode, as long as the power of the PT-RS matches with the power of the user data to be sent, the data to be sent via physical uplink shared channel (PUSCH), the peak-to-average power ratio of the transmitted signal and the complexity of computing the DFT does not increase, and the system performance does not decrease either. For the pre-DFT mode, only a single PT-RS in the time domain is currently considered.

Considering that the uplink DFT-S-OFDM waveform is mainly used in a scenario with a limited link quality, a signal-to-noise ratio of the system is not very high, and influence of the random noise on the PT-RS may not be neglected. Therefore, the current design that inserts a single PT-RS in the time domain may result in a wrong phase estimation, which does not improve but deteriorate the system performance.

SUMMARY

A method and an apparatus for transmitting an uplink data and a user equipment is provided, which may increase the accuracy of tracking phase noise and possible system residual frequency shift and Doppler frequency shift, and may improve system performance.

In one aspect, a method for transmitting an uplink data according to one embodiment of this disclosure is provided, including: inserting multiple phase noise tracking reference signal (PT-RS) groups into a user data to be sent in time domain, according to a predefined interval, wherein each group of the phase noise tracking reference signal includes one or multiple PT-RS(s) of adjacent sampling points in the time domain; transforming the inserted multiple phase noise tracking reference signal groups together with the user data to be sent into frequency domain through a discrete Fourier transform (DFT) followed with a subcarrier mapping, and then with a transformation through an inverse fast Fourier transform (IFFT), to obtain an uplink DFT-S-OFDM waveform; and transmitting the uplink DFT-S-OFDM waveform.

In one embodiment, wherein inserting multiple PT-RS groups into the user data to be sent in the time domain according to the predefined interval may include: inserting one PT-RS group every a predefined number of the sampling point, according to a predefined time domain shift relative to a starting point of the user data to be sent, wherein each PT-RS group includes one PT-RS.

In one embodiment, wherein inserting multiple PT-RS groups into a user data to be sent in time domain according to the predefined interval, may include: inserting one PT-RS group every a predefined number of the sampling points, according to a predefined time domain shift relative to the starting point of the user data to be sent, wherein each PT-RS group includes multiple successive PT-RSs in the time domain.

In one embodiment, wherein a number of the PT-RS included in each inserted PT-RS group may be determined according to a downlink control information (DCI) sent by a base station.

In another aspect, an apparatus for transmitting an uplink data is provided, including: an inserting circuitry configured to insert multiple phase noise tracking reference signal (PT-RS) groups into a user data to be sent in time domain according to the predefined interval; wherein each group of the phase noise tracking reference signal includes one or multiple PT-RS(s) of adjacent sampling points in the time domain; a transforming circuitry configured to transform the inserted multiple phase noise tracking reference signal groups together with the user data to be sent into frequency domain through a discrete Fourier transform (DFT) followed with a subcarrier mapping, and then with a transformation through an inverse fast Fourier transform (IFFT), to obtain an uplink DFT-S-OFDM waveform; and a transmission circuitry configured to transmit the uplink DFT-S-OFDM waveform.

In one embodiment, wherein the inserting circuitry may be configured to insert a PT-RS group every a predefined number of the sampling points according to a predefined time domain shift relative to a starting point of the user data to be sent, wherein each PT-RS group includes one PT-RS.

In one embodiment, wherein the inserting circuitry may be configured to insert a PT-RS group every a predefined number of the sampling points according to a predefined time domain shift relative to a starting point of the user data to be sent, wherein each PT-RS group includes multiple successive PT-RSs in the time domain.

In one embodiment, wherein a number of the PT-RS included in each PT-RS group inserted by the inserting circuitry may be determined according to a downlink control information (DCI) sent by a base station.

In another aspect, a user equipment according to one embodiment of this disclosure is provided, the user equipment includes the apparatus for transmitting an uplink data described above.

A method and an apparatus for transmitting the uplink data and user equipment according to one embodiment of this disclosure are provided. Multiple phase noise tracking reference signal (PT-RS) groups are inserted into a user data to be sent in time domain according to the predefined interval, the inserted multiple phase noise tracking reference signal groups together with the user data to be sent are transformed into frequency domain through a discrete Fourier transform (DFT) followed with a subcarrier mapping, and then with a transformation through an inverse fast Fourier transform (IFFT), to obtain an uplink DFT-S-OFDM waveform, and then the uplink DFT-S-OFDM waveform is transmitted. Compared with an existing technical solution, embodiments of this disclosure may increase the accuracy of tracking the phase noise and the possible system residual frequency shift and Doppler frequency shift, and may improve the system performance.

DETAILED DESCRIPTION

To make objectives, technical solutions, and advantages of embodiments of this present disclosure more comprehensible, the technical solutions in the embodiments of this present disclosure are clearly and completely described in the following with reference to the accompanying figures in the embodiments of this present disclosure. Apparently, the embodiments described here are only a part but not all of the embodiments of this present disclosure. All other embodiments obtained by those skilled in the art without any creative efforts based on the embodiments of this present disclosure fall within a protection scope of this present disclosure.

Figure 1:
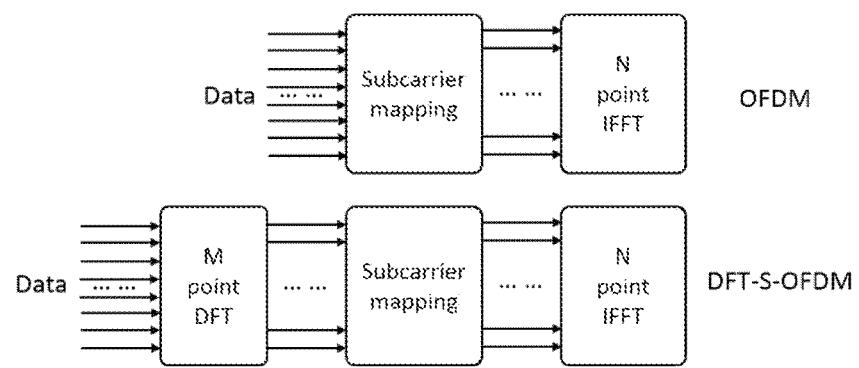
FIG. 1 schematically illustrates a comparison diagram of a process of generating a OFDM waveform and a process of generating a DFT-S-OFDM waveform.
Figure 2:
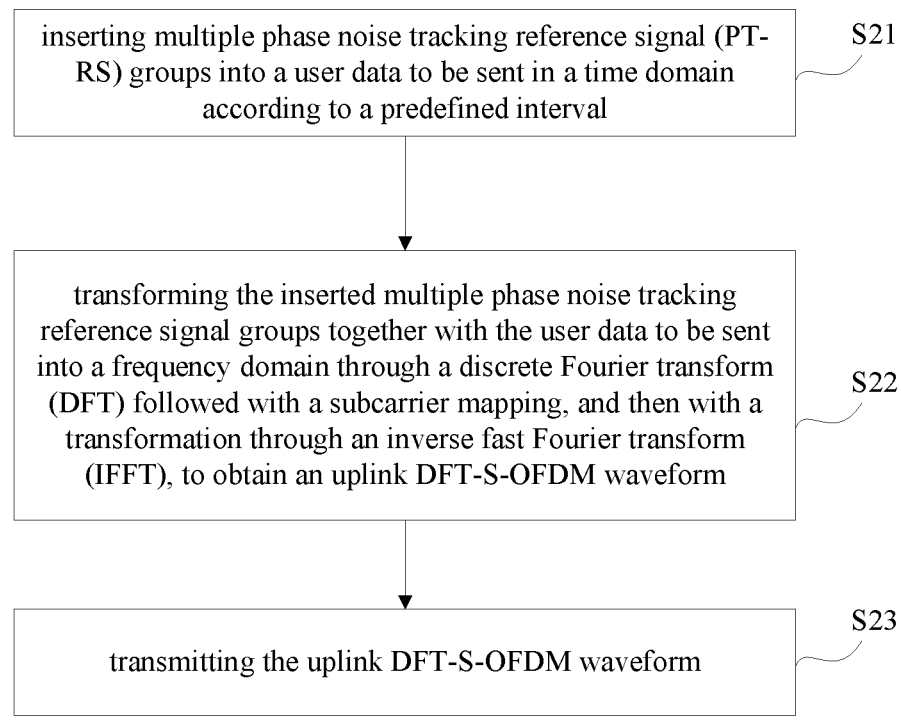
FIG. 2 schematically illustrates a flow chart of a method for transmitting an uplink data according to an embodiment of this disclosure.

A method for transmitting an uplink data according to an embodiment of this disclosure is provided, referring to FIG. 2, the method may include:

Step S21: inserting multiple phase noise tracking reference signal (PT-RS) groups into a user data to be sent in time domain according to a predefined interval.

Step S22: transforming the inserted multiple phase noise tracking reference signal groups together with the user data to be sent into frequency domain through a discrete Fourier transform (DFT) followed with a subcarrier mapping, and then with a transformation through an inverse fast Fourier transform (IFFT), to obtain an uplink DFT-S-OFDM waveform.

Step S23: transmitting the uplink DFT-S-OFDM waveform.

In the method for transmitting the uplink data provided by one embodiment of this disclosure, multiple phase noise tracking reference signal (PT-RS) groups are inserted into a user data to be sent in time domain according to the predefined interval, the inserted multiple phase noise tracking reference signal groups together with the user data to be sent are transformed into frequency domain through a discrete Fourier transform (DFT) followed with a subcarrier mapping, and then with a transformation through an inverse fast Fourier transform (IFFT), and then the uplink DFT-S-OFDM waveform is transmitted. Compared with an existing technical solution, embodiments in this disclosure may increase the accuracy of tracking the phase noise and the possible system residual frequency shift and Doppler frequency shift, and may improve the system performance.

Figure 3:
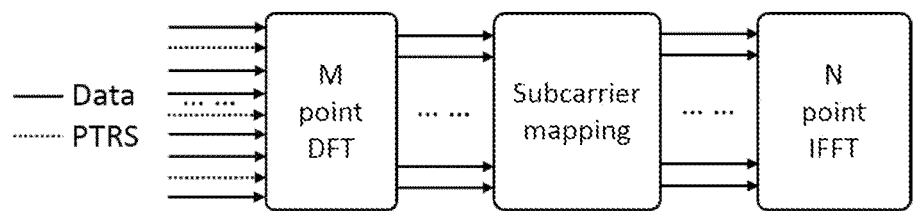
FIG. 3 schematically illustrates a diagram of a process of inserting a PT-RS into an uplink DFT-S-OFDM waveform according to an embodiment of this disclosure.
Figure 4:
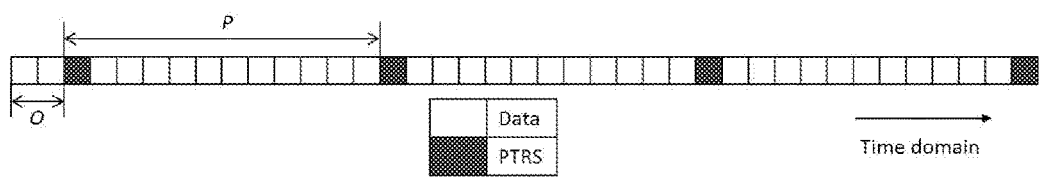
FIG. 4 schematically illustrates a time-domain resource pattern of the PT-RS in a single-antenna transmission mode or a SU-MIMO respectively according to an embodiment of this disclosure.

Specifically, referring to FIG. 3, the DFT-S-OFDM waveform is configured on the user equipment side, the PT-RS and the user data to be sent are performed with an M-point DFT operation together. Assuming that the PT-RS occupies X sampling points in the time domain, the user data to be sent in the time domain should occupy (M-X) sampling points. At a receiving side of the base station, the received uplink DFT-S-OFDM waveform is performed with an N-point FFT operation first, followed with a subcarrier mapping, with an M-point IDFT operation, and then with an extraction of the PT-RS from the obtained data in the time domain. Phase estimation is performed so that the received data may be compensated for.

The PT-RS group resources may be discretely in the time domain inserted into the user data to be sent, and each group of the phase noise tracking reference signal includes one or multiple PT-RS(s) of adjacent sampling points in the time domain. A specific PT-RS resource pattern is related to a band width of the user equipment and a method for modulating and coding configured by the downlink control information (DCI).

Case 1: in an uplink single antenna transmission mode, the time-domain resource pattern of the PT-RS is shown in FIG. 3. A period of the PT-RS in the time domain has P sampling points, and only one PT-RS is included in every PT-RS period, and the time domain shift of the one PT-RS relative to a starting point of the user data to be sent has O sampling points. In an uplink single user-multiple input multiple output (SU-MIMO) transmission mode, assuming that the phase noise, the possible system residual frequency shift and Doppler frequency shift distribution in different layers are the same, and in this case, different layers may share a same PT-RS resource pattern, and the PT-RS time-domain resource pattern is the same as the PT-RS time-domain resource pattern in the single antenna transmission mode, as shown in FIG. 3.

Figure 5:
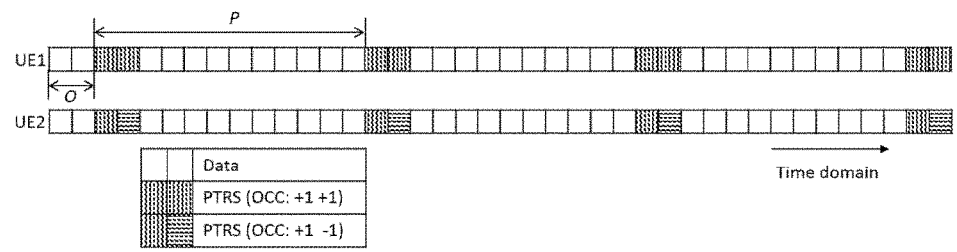
FIG. 5 schematically illustrates a time-domain resource pattern of a PT-RS in a MU-MIMO according to an embodiment of this disclosure.

Case 2: in an uplink multiple user-multiple input multiple output (MU-MIMO) transmission mode, the phase noise and possible system residual frequency shift and Doppler frequency shift of different UEs may be different, therefore, the PT-RS time-domain resource pattern shown in FIG. 5 is needed to be considered. In this case, the period of the PT-RS in the time domain is still P, but there are multiple PT-RSs in each PT-RS period, and interference between different PT-RSs may be avoided by a time-domain orthogonal code. Likewise, the time domain shift of the PT-RS in every PT-RS relative to a starting point of the user data to be sent may have O sampling points.

Figure 6:
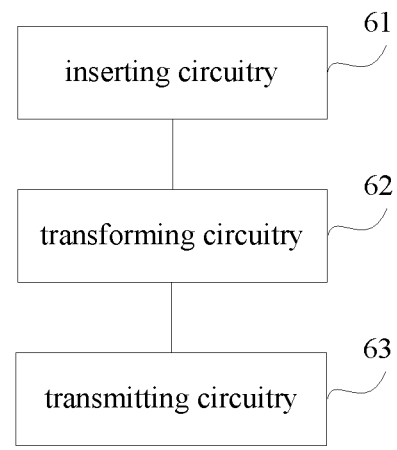
FIG. 6 schematically illustrates an apparatus for transmitting an uplink data according to another embodiment of this disclosure.

An apparatus for transmitting an uplink data according to one embodiment of this disclosure is further provided, referring to FIG. 6, the apparatus may include: an inserting circuitry 61, a transforming circuitry 62 and a transmitting circuitry 63.

The inserting circuitry 61 may be configured to: insert multiple phase noise tracking reference signal (PT-RS) groups into a user data to be sent in the time domain according to the predefined interval; wherein each group of the phase noise tracking reference signal includes one or multiple PT-RS(s) of adjacent sampling points in the time domain The transforming circuitry 62 may be configured to: transform the inserted multiple phase noise tracking reference signal groups together with the user data to be sent into frequency domain through a discrete Fourier transform (DFT), and then transform the inserted multiple phase noise tracking reference signal groups together with the user data to be sent through an inverse fast Fourier transform (IFFT) after the inserted multiple phase noise tracking reference signal groups together with the user data to be sent being subcarrier mapped, to obtain an uplink DFT-S-OFDM waveform.

The transmitting circuitry 63 may be configured to transmit the uplink DFT-S-OFDM waveform.

In the apparatus for transmitting the uplink data provided by one embodiment of this disclosure, multiple phase noise tracking reference signal groups are inserted into a user data to be sent in the time domain according to the predefined interval, the inserted multiple phase noise tracking reference signal groups together with the user data to be sent are transformed into frequency domain through a discrete Fourier transform (DFT) followed with a subcarrier mapping, and then with a transformation through an inverse fast Fourier transform (IFFT), to obtain an uplink DFT-S-OFDM waveform, and then the uplink DFT-S-OFDM waveform is sent. Compared with an existing technical solution, embodiments in this disclosure may increase the accuracy of tracking the phase noise and the possible system residual frequency shift and Doppler frequency shift, and may improve the system performance.

Optionally, the inserting circuitry 61 may be configured to insert a PT-RS group every a predefined number of the sampling points according to a predefined time domain shift relative to a starting point of the user data to be sent, wherein each PT-RS group includes one PT-RS.

Optionally, the inserting circuitry 61 may be configured to insert a PT-RS group every a predefined number of the sampling points according to a predefined time domain shift relative to a starting point of the user data to be sent, wherein each PT-RS group includes multiple successive PT-RSs in the time domain.

Optionally, a number of the PT-RS included in each PT-RS group inserted by the inserting circuitry 61 may be determined according to a downlink control information (DCI) sent by a base station.

The apparatus according to one embodiment of this disclosure may be implemented to perform the technical solutions described in the above method embodiments, its corresponding implementation principle and technical effect is similar, and is not described herein again.

A user equipment according to one embodiment of this disclosure is further provided, and the user equipment may include the apparatus for transmitting an uplink data described above.

Those skilled in the art may understand that all or a part of the processes for implementing the methods in the above described embodiments may be implemented by a computer program instructing a relevant hardware. The program may be stored in a computer-readable storage medium. When the program is executed, the processes in the above described embodiments of each method may be included. The storage medium may be a magnetic disk, an optical disk, a read-only memory (ROM) or a random access memory (RAM), or the like.

The embodiments described above are merely a specific embodiment of the present disclosure, but a protection scope of the present disclosure is not limited thereto. Changes or substitutions within a technical scope disclosed in the present disclosure which may be easily conceived by anyone skilled in the art, should be covered by the protection scope of the present disclosure. Therefore, the protection scope of the present disclosure should be subject to the protection scope of the claims.

What is claimed is:

1. A method for transmitting an uplink data, comprising:
   inserting multiple phase noise tracking reference signal (PT-RS) groups into a user data to be sent in time domain, according to the predefined interval; wherein each group of the phase noise tracking reference signal comprises multiple PT-RSs of adjacent sampling points in the time domain;
   transforming the inserted multiple phase noise tracking reference signal groups together with the user data to be sent into frequency domain through a discrete Fourier transform (DFT) followed with a subcarrier mapping, and then with a transformation through an inverse fast Fourier transform (IFFT), to obtain an uplink DFT-S-OFDM waveform; and
   transmitting the uplink DFT-S-OFDM waveform,
   wherein inserting multiple PT-RS groups into the user data to be sent in time domain according to the predefined interval, comprises:
   inserting a PT-RS group every a predefined number of the sampling points according to a predefined time domain shift relative to a starting point of the user data to be sent, wherein each PT-RS group comprises multiple successive PT-RSs in the time domain.

2. The method according to claim 1, wherein a number of the PT-RS comprised in each inserted PT-RS group is determined according to a downlink control information (DCI) sent by a base station.

3. An apparatus for transmitting an uplink data, comprising:
- an inserting circuitry, configured to: insert multiple phase noise tracking reference signal (PT-RS) groups into a user data to be sent in time domain according to the predefined interval; wherein each group of the phase noise tracking reference signal comprises multiple PT-RSs of adjacent sampling points in the time domain;
- a transforming circuitry, configured to: transform the inserted multiple phase noise tracking reference signal groups together with the user data to be sent into frequency domain through a discrete Fourier transform (DFT) followed with a subcarrier mapping, and then with a transformation through an inverse fast Fourier transform (IFFT), to obtain an uplink DFT-S-OFDM waveform; and
- a transmitting circuitry, configured to: transmit the uplink DFT-S-OFDM waveform,
- wherein the inserting circuitry is further configured to insert a PT-RS group every a predefined number of the sampling points according to a predefined time domain shift relative to a starting point of the user data to be sent, wherein each PT-RS group comprises multiple successive PT-RSs in the time domain.

4. The apparatus according to claim 3, wherein a number of the PT-RS comprised in each PT-RS group inserted by the inserting circuitry is determined according to a downlink control information (DCI) sent by a base station.

5. A user equipment, comprising the apparatus for transmitting an uplink data according to claim 3.

6. The method according to claim 1, wherein the multiple PT-RSs comprised in each PT-RS group are orthogonal in the time domain and/or in the code domain.

7. The method according to claim 1, wherein a PT-RS resource pattern is determined based on a band width of a user equipment and a method for modulating and coding that are configured by a DCI.

8. The apparatus according to claim 3, wherein the multiple PT-RSs comprised in each PT-RS group are orthogonal in the time domain and/or in the code domain.

9. The user equipment according to claim 5, wherein the multiple PT-RSs comprised in each PT-RS group are orthogonal in the time domain and/or in the code domain.

* * * * *